Patented June 14, 1927.

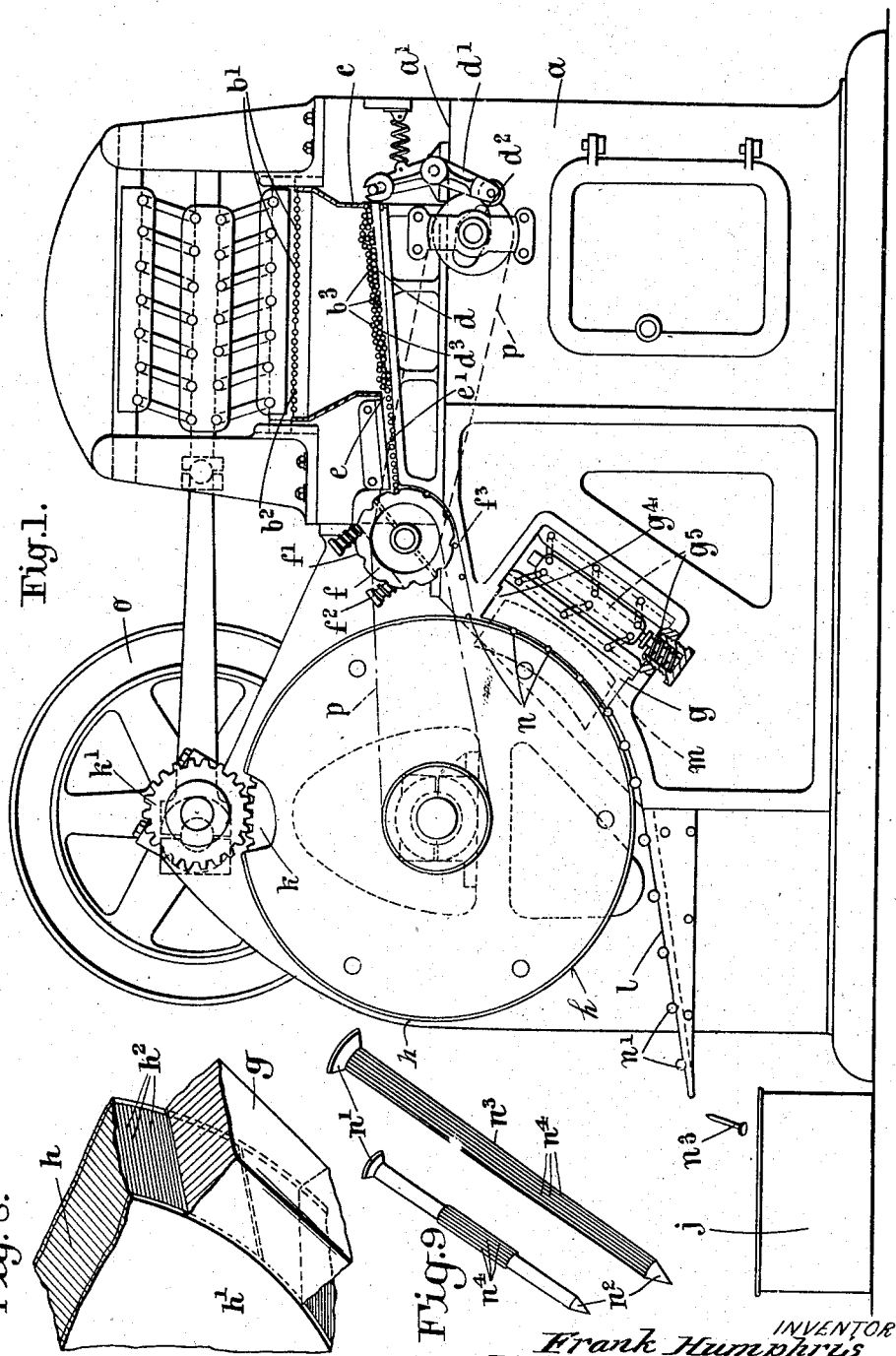

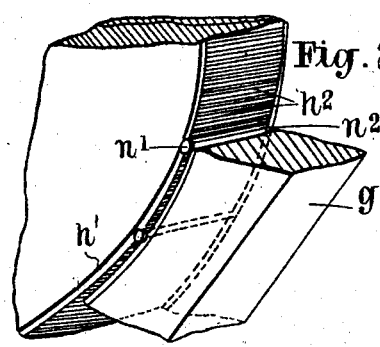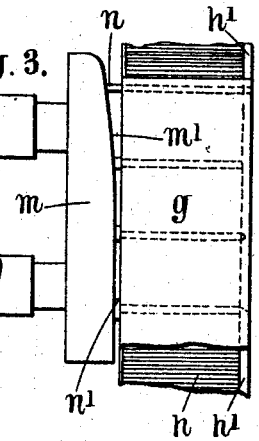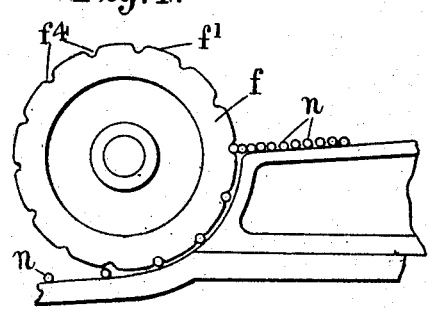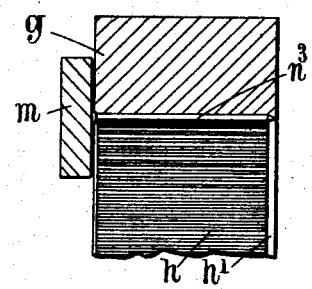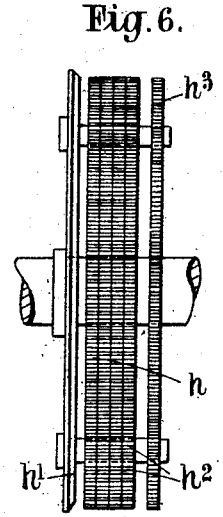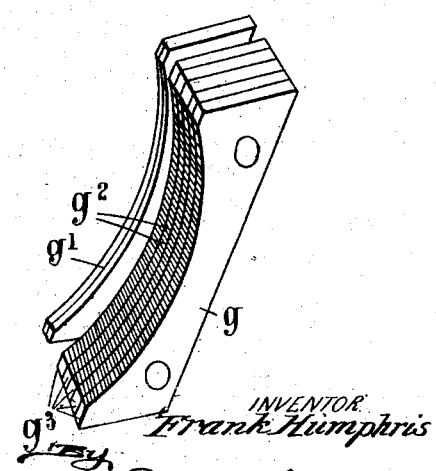

1,632,703

UNITED STATES PATENT OFFICE.

FRANK HUMPHRIS, OF PARKSTONE, ENGLAND, ASSIGNOR OF ONE-HALF TO KENNETH ALEXANDER ROBERTS, OF LONDON, ENGLAND.

MACHINE FOR MANUFACTURING NAILS, BRADS, OR THE LIKE FROM WIRE, ROD, OR THE LIKE.

Application filed December 12, 1922, Serial No. 606,497, and in Great Britain December 22, 1921.

This invention relates to a new or improved machine for manufacturing nails, brads, or the like from wire, rod or the like.

The machine forming the subject of this invention comprises a revolving-milled-drum and a co-operating milled counter-pressure-block, between which the blanks or short lengths of wire, rod or the like to be made into nails or the like are constrained to roll during the formation of both their points and their heads. Other subsidiary mechanical devices are employed, as hereinafter described, to feed cut-off lengths of stock between the beforementioned revolving-milled-drum.

An object of this invention, is to construct a machine provided with a rotatably mounted milled-drum which will, by successive and progressive operations, produce longitudinally serrated, headed and pointed wire nails, brads or the like from lengths of wire; the object in providing the serrations on such nails being to increase the external gripping surface of the nail or the like, and to increase the rigidity of its shank without enlarging the diameter of the original stock from which it is made. The machine operations take place in such a manner that, whilst the nail or other blanks are being cut off, other blanks previously cut off are being passed by suitable mechanism through their serrating, heading and pointing operations. The beforementioned blanks are continuously fed through the machine, and the principal operations or stages in the manufacture of a nail or the like are carried on simultaneously and continuously, thereby ensuring a very large output of finished nails or other articles from the machine.

An important feature of the machine is that the head and also the point of each nail formed by it are absolutely concentrically located in relation to the axis of the shank from which it is formed, and any bends in the wire are automatically straightened out during the serrating operation.

In the accompanying drawings:—

Figure 1 is a front elevation with some of the parts removed of the improved machine for producing nails or other articles from wire.

Figure 2 is a perspective view on an enlarged scale partly in section of a part of a solid cylindrically-formed roll or drum and a part of a solid counter-pressure block.

Figure 3 is an edge view on an enlarged scale partly in section of parts of the milled-drum and part of the counter-pressure-block shown in Figure 2, together with a vibrator-plate or header.

Figure 4 is a front elevational view on an enlarged scale of a spacing feed-drum or roller.

Figure 5 is a plan view on an enlarged scale in cross section of the vibrator-plate or header and the counter-pressure-block and a part of the milled-drum.

Figure 6 is an edge view of the milled-drum.

Figure 7 is a perspective view of the counter-pressure-block on an enlarged scale.

Figure 8 is a perspective view on an enlarged scale partly in section of a part of a solid cylindrically-formed milled-roll or drum, with a part of its cooperating counter-pressure block.

Figure 9 is a perspective view of two examples of fluted or partly headed nails.

The machine constituting this invention, is preferably constructed to have a box frame $a$ provided with a table $a^1$ and the necessary arms, brackets, or the like, or on which the chief moving parts of the machine are mounted. Above the table $a^1$ is provided a multiple-wire-cropper $b^2$ into which is fed by any known wire feed mechanism, a number of wires $b^1$ from which blanks $b^3$ are cropped off and fall into hopper $c$ where they are transversely stacked in longitudinal contact one with the other. At the bottom of the said hopper $c$ a ribbed-sliding-shift-plate $d$ is agitated by a cam $d^2$ through a forked-rocking-lever $d^1$; these movements induce the ribbed-sliding-shift-plate $d$ to feed through a slot $e$ into a channel-tube $e^1$, a continuous transversely arranged stream of blanks $b^3$ which are arrested in their progress by a flexibly-mounted spacing-feed-drum or roller $f$ with grooves $f^4$ in its periphery $f^1$ which regulates their rate of delivery into a chute $f^3$ provided to convey them between a rotatably mounted and transversely milled-drum $h$ and its co-operating and correspondingly milled counter-pressure-block $g$ which may be composed of plates $g^3$ as shown in Figure 7 of the drawings, and whilst this occurs, by the provision on both the revolving-milled-drum $h$ and the counter-pressure-block $g$ of flanges $h^1$ and $g^1$ arranged at the desired angle on one or both sides thereof, the point $n^2$ of the product $n^3$ (Fig. 9) or the like is formed; at the same time, by the provision of a high-speed reciprocating heading-plate $m$, heads $n^1$ of the product $n^3$ are formed, or by providing flanges $h^1$ or alternately reciprocating heading-plates $m$ on both sides of the milled-drum $h$ both ends of a blank $m$ may have points $n^2$, or heads $n^1$, as desired. The whole combination of mechanical movements are coupled together by means of suitable gearing consisting of a toothed wheel, $k$, a pinion $k^1$ on a crank-shaft carrying a fly-wheel $o$ and chains or belts $p$ of the known type and are driven in the usual way.

The milled-drum $h$ is provided with fine teeth $h^2$ on or around its periphery and it may be made in one solid piece, or built up in laminar form from plates, rings or segments $h^3$, as shown in Fig. 6, for the purpose of enabling nails $n^3$, or the like of different lengths to be made. The serrations $h^2$ serve to rotate the nail blank $n$ or the like during its heading and pointing.

After passing under the spacing drum $f$ supported by springs $f^2$, the blanks $n$, stubs or the like are brought between the periphery of the revolving milled drum $h$ and the corresponding and co-operating concentrically milled face $g^2$ and flange $g^1$ of the counter-pressure-block $g$. Said milled counter-pressure-block $g$ is mounted in guides $g^4$ and held against the blanks $n$ by means of a spring $g^5$ acting through toggle levers or their equivalents. To suit the different diameters of wire employed for making nails or other articles it is necessary to provide in each case counter-pressure-blocks $g$ whose acting-face-curvature corresponds to a true concentric line relative to the axis of the milled drum $h$ when wire is being operated upon between it and the periphery of said milled-drum $h$. As the milled-drum $h$ revolves, it rolls the nail blanks $n$ or the like across the milled-face $g^2$ of the counter-pressure-block $g$ causing the blanks $n$ or the like to revolve at a great speed and at the same time it serrates them, as shown at $n^4$. When blanks or the like $n$ are made into nails $n^3$ by this rolling process, one end of each blank $n$ may be brought between pointing devices consisting of cutters, rollers, or the like, but preferably and as before described one edge of the milled-drum $h$ and the corresponding edge of the counter-pressure-block $g$ are fashioned into tapered flanges $h^1$ and $g^1$ to form the point $n^2$ which is thereby rolled out on the spinning blank. Simultaneously with the rolling-out of the point the vibrator-plate or header $m$, operated by pneumatic, hydraulic or mechanical means, not shown, is caused to operate upon the other or opposite ends of said spinning blanks $n$, and by its blows form that part of the spinning blank $n$ which protrudes beyond the bevelled, curved or plain head-forming edges of the milled-drum $h$ and counter-pressure-block $g$ into a spun and beaten head $n^1$ concentric with the shank thereof. The face of the vibrator-plate $m$ is curved or set at an angle $m^1$ from the plane of the head-forming faces of the milled-drum $h$ and the counter-pressure-block $g$ in a manner that the depth of the blow will be less as the blank $n$ first enters it, and increasing as shown in Figure 5 of the drawings to full depth as the head $n^1$ is formed thereon.

After the heading of the blanks has been completed, nails, brads, pins or the like roll down a delivery chute $l$ and drop into a receptacle $j$ ready to be packed.

The milled-drum $h$, may in conjunction with its counter-pressure-block $g$, be so milled that they are capable of producing on the nail-blank $n$ or any other article passed between them, annular ridges and grooves, knurling, spirally-formed or any pattern, figured or otherwise.

The wear of the working parts is reduced to a minimum, as the greater part of the operating surfaces are rotating on the comparatively soft material from which nails, or the like are formed, and these take the wear.

The machine may be provided with a double-pointing milled-revolving-drum and its concomitants as shown in Figure 8 of the drawings.

It will be obvious that, by heating the wire, rod or the like before it is passed through the machine or by interposing a heating or re-heating chamber of the known kind between the spacing-feed-drum $f$ and the milled-drum $h$ and counter-pressure-block $g$, heated blanks $n$ or the like can be fed and hot-rolled in their more ductile condition and into forms not possible in their cold state without departing from the spirit of the invention.

What I claim is:—

1. A machine for making nails from wire, comprising a rotary drum, a pressure block associated with said drum and a heading plate cooperating with said drum and pressure block to enlarge one end of each blank fed between the drum and pressure block.

2. A machine for making nails from wire, comprising a rotary drum, a pressure block associated with said drum, and a heading plate arranged laterally to the drum and block to enlarge one end of each blank fed between the drum and pressure block.

3. A machine for making nails from wire, comprising a rotary drum, a pressure block associated with said drum, and a heading plate having its operative face arranged at an angle to the lateral faces of the drum and block to gradually enlarge one end of each blank fed between the drum and pressure block.

4. A machine for making nails from wire, comprising a rotary drum, a pressure block cooperating with said drum, a spacing drum for delivering blanks singly and in spaced relation between the rotary drum and pressure block, and a heading plate co-operating with said drum and pressure block to enlarge one end of each blank fed between the drum and pressure block.

5. A machine for making nails from wire, comprising a rotary drum, a pressure block cooperating with said drum, a flexibly supported feed drum for delivering blanks singly and in spaced relation to be operated upon between the rotary drum and pressure block, and a heading plate co-operating with said drum and pressure block to enlarge one end of each blank fed between the drum and pressure block.

6. A machine for making nails from wire, comprising a rotary drum, a pressure block associated with said drum, guides in which said block is movable radially to the axis of the drum, and a heading plate co-operating with said drum and pressure block to enlarge one end of each blank fed between the drum and pressure block.

7. A machine for making nails from wire, comprising a rotary drum, a pressure block associated with said drum, toggle levers supporting the said block, a spring acting through the said toggle levers to press the block towards the drum and a heading plate co-operating with said drum and pressure block to enlarge one end of each blank fed between the drum and pressure block.

8. A machine for making nails from wire, comprising a rotary drum, a pressure block cooperating with said drum, and a heading plate co-operating with said drum and pressure block to enlarge one end of each blank fed between the drum and pressure block and resiliently supported concentrically to the drum.

9. A machine for making nails from wire, comprising a rotary drum having a milled face, a pressure block having a milled face cooperating with said drum and supported concentrically to the drum and a heading plate co-operating with said drum and pressure block to enlarge one end of each blank fed between the drum and pressure block.

10. A machine for making nails from wire comprising a rotary drum, a pressure block associated with said drum, guiding means supporting said pressure block, and a heading plate co-operating with said drum and pressure block to enlarge one end of each blank fed between the drum and pressure block, the drum and block being each built up of a plurality of plates the edges of which form the operative faces of the drum and block.

11. A machine for making nails from wire comprising a rotary drum built up of a plurality of plates the edges of which form the operative face of the drum, a pressure block associated with said drum, and a heading plate co-operating with the drum and pressure block to enlarge one end of each blank fed between the said drum and block.

12. A machine for making nails from wire, comprising a rotary drum a pressure block built up of a plurality of plates the edges of which form the operative face of the block, and a heading plate co-operating with said drum and pressure block to enlarge one end of each blank fed between the drum and pressure block.

13. A machine for making nails from wire wire, comprising a rotary drum, a pressure associated with said drum, a feed drum arranged to supply blanks singly to the rotary drum and block with their longitudinal axes substantially parallel to the axis of the rotary drum, and a heading plate co-operating with said drum and pressure block to enlarge one end of each blank fed between the drum and pressure block.

14. A machine for making nails from wire comprising a rotary drum, a pressure block associated with said drum, a feed drum arranged to deliver blanks singly between the rotary drum and pressure block, a channel conducting the blanks in close formation to the feed drum, and a heading plate co-operating with said drum and passage block to enlarge one end of each blank fed between the drum and pressure block.

15. A machine for making nails from wire, comprising a rotary drum, a pressure block associated with said drum and means co-operating with said drum and pressure block to enlarge one end of each wire blank fed thereto to form a nail head.

16. A machine for making nails from wire, comprising a rotary drum, a pressure block co-operating with said drum, a spacing drum for delivering blanks singly and in spaced relation between the rotary drum and pressure block, and means associated with the drum and pressure block to enlarge one end of each blank fed thereto to form a nail head.

17. A machine according to claim 16 wherein the spacing drum is yieldably supported.

18. A machine according to claim 15 having guides wherein the pressure block is movable radially to the drum.

19. A machine according to claim 15 wherein the pressure block is supported by toggle levers and a spring acts through said toggle levers to press the block toward the drum.

20. A machine for making nails from wire, comprising a rotary drum, a pressure block co-operating with said drum and resiliently supported concentrically to the drum, and means associated with the drum and pressure block to enlarge one end of each blank fed thereto to form a nail head.

21. A machine for making nails from wire, comprising a rotary drum having a milled face, a pressure block having a milled face co-operating with said drum and supported concentrically to the drum, and means associated with the drum and pressure block to enlarge one end of each blank fed thereto to form a nail head.

22. A machine for making nails from wire, comprising a rotary drum, a pressure block associated with said drum, guiding means supporting said pressure block, and means co-operating with the drum and pressure block to enlarge one end of each blank fed thereto to form a nail head, the drum and block being each built up of a plurality of plates the edges of which form the operative faces of the drum and block.

23. A machine according to claim 15 wherein the rotary drum is built up of a plurality of plates of which the edges form the operative face of the drum.

24. A machine according to claim 15 wherein the pressure block is built up of a plurality of plates of which the edges form the operative face of the block.

25. A machine for making nails from wire, comprising a rotary drum, a pressure block associated with said drum, a feed drum arranged to supply blanks singly to the rotary drum and block with their longitudinal axes substantially parallel to the axis of the rotary drum, and means associated with said rotary drum and pressure block to enlarge one end of each blank to form a nail head.

26. A machine for making nails from wire, comprising a rotary drum, a pressure block associated with said drum, a feed drum arranged to deliver blanks singly between the rotary drum and pressure block, a channel conducting the blanks in close formation to the feed drum, and means co-operating with said rotary drum and pressure block to enlarge one end of each blank to form a nail head.

27. A machine for making nails from wire, comprising a rotary drum, a pressure block associated with said drum and a heading plate associated with the rotary drum and pressure block having its operative face arranged at an angle to the lateral faces of the drum and block to enlarge gradually one end of each blank fed between the drum and block.

28. A machine for making nails from wire, comprising a rotary drum, a pressure block co-operating with said drum, a spacing drum for delivering blanks singly and in spaced relation between the rotary drum and pressure block, and a heading plate associated with the rotary drum and pressure block having its operative face arranged at an angle to the lateral faces of the drum and block to enlarge gradually one end of each blank fed between the drum and block.

29. A machine according to claim 28 wherein the drum for delivering blanks between the rotary drum and pressure block is yieldably supported.

30. A machine according to claim 27 embodying guides in which the pressure block is movable radially to the axis of the rotary drum.

31. A machine according to claim 27 embodying toggle levers which support the pressure block and wherein there is a spring which acts through said toggle levers to urge the pressure block towards the drum.

32. A machine according to claim 27 wherein the pressure plate is resiliently supported concentrically with the drum.

33. A machine according to claim 21 wherein the pressure block is supported concentrically to the rotary drum and the means for enlarging one end of each blank fed to the rotary drum and pressure block comprises a heading plate having its operative face arranged at an angle to the lateral faces of the drum and pressure block.

London, England, 1st December, 1922.

FRANK HUMPHRIS.